US011620095B2

(12) United States Patent
Hagiwara et al.

(10) Patent No.: US 11,620,095 B2
(45) Date of Patent: Apr. 4, 2023

(54) INFORMATION PROCESSING APPARATUS AND NON-TRANSITORY COMPUTER READABLE MEDIUM FOR INFORMATION PROCESSING

(71) Applicant: FUJIFILM BUSINESS INNOVATION CORP., Tokyo (JP)

(72) Inventors: Nobuki Hagiwara, Kanagawa (JP); Makoto Kondo, Kanagawa (JP); Naomi Takahashi, Kanagawa (JP); Takanori Haginaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 207 days.

(21) Appl. No.: 16/564,474

(22) Filed: Sep. 9, 2019

(65) Prior Publication Data
US 2020/0089444 A1    Mar. 19, 2020

(30) Foreign Application Priority Data
Sep. 19, 2018   (JP) .............................. JP2018-174585

(51) Int. Cl.
*G06F 3/12*    (2006.01)
*H04N 1/00*    (2006.01)

(52) U.S. Cl.
CPC .......... *G06F 3/1232* (2013.01); *G06F 3/1205* (2013.01); *G06F 3/1225* (2013.01);
(Continued)

(58) Field of Classification Search
CPC .... G06F 3/1232; G06F 3/1205; G06F 3/1225; G06F 3/1254; G06F 3/1255;
(Continued)

(56) References Cited

U.S. PATENT DOCUMENTS 5,604,843 A * 2/1997 Shaw .................... G06F 3/1296
                                              358/1.1
6,952,831 B1 * 10/2005 Moore .................. G06F 3/1204
                                              719/321

(Continued)

FOREIGN PATENT DOCUMENTS

JP    2009223834 A  * 10/2009  ........... G06F 3/1205
JP    2017-157044 A     9/2017

OTHER PUBLICATIONS

Jul. 26, 2022 Office Action issued in Japanese Patent Application No. 2018-174585.

*Primary Examiner* — Huo Long Chen
(74) *Attorney, Agent, or Firm* — Oliff PLC (57) ABSTRACT

An information processing apparatus includes a first printer driver, and a second printer driver. The first printer driver includes prohibition information specific to a device that is to be controlled. The second printer driver includes an association establishing unit and a receiving unit. The association establishing unit establishes an association with the first printer driver. The receiving unit receives print settings. The second printer driver transmits, to the device that is to be controlled, print data based on print settings that have been obtained through conversion performed on the basis of the prohibition information included in the first printer driver. The association establishing unit establishes the association with the first printer driver.

12 Claims, 9 Drawing Sheets (52) U.S. Cl.
CPC .......... *G06F 3/1254* (2013.01); *G06F 3/1255* (2013.01); *H04N 1/00408* (2013.01)

(58) Field of Classification Search
CPC .... G06F 3/1284; G06F 3/1253; G06F 3/1236; G06F 3/1279; H04N 1/00408
See application file for complete search history.

(56) References Cited

U.S. PATENT DOCUMENTS

| | | |
|---|---|---|
| 10,001,956 B2 | 6/2018 | Uchida |
| 2006/0200644 A1* | 9/2006 | Asada .................... G06F 3/123 711/205 |
| 2007/0216944 A1* | 9/2007 | Furuya ................. G06F 3/1247 358/1.15 |
| 2016/0054956 A1* | 2/2016 | Otsuka ................. G06F 3/1276 358/1.13 |
| 2020/0004478 A1* | 1/2020 | Saito .................... G06F 3/1234 |

* cited by examiner

INFORMATION PROCESSING APPARATUS AND NON-TRANSITORY COMPUTER READABLE MEDIUM FOR INFORMATION PROCESSING

CROSS-REFERENCE TO RELATED APPLICATIONS

This application is based on and claims priority under 35 USC 119 from Japanese Patent Application No. 2018-174585 filed Sep. 19, 2018.

BACKGROUND

(i) Technical Field

The present disclosure relates to an information processing apparatus and a non-transitory computer readable medium for information processing.

(ii) Related Art

Japanese Unexamined Patent Application Publication No. 2017-157044 discloses a technique for addressing an issue in which, in use of a printer driver installer of the related art, a user themselves needs to set complicated settings and the like, such as print settings and environment settings, in replacement of a printer driver of an old architecture with a printer driver of a new architecture. In the technique, a subset or all of print settings (DEVMODE) for a first print queue are converted into print settings (PrintTicket) in a format adopted in a second printer driver. The generated print settings (PrintTicket) in the format adopted in the second printer driver are used as print settings for a second print queue.

In an information processing apparatus in which a first printer driver and a second printer driver have been installed, in the case where the first printer driver includes prohibition information which describes unusable combinations of a function and a sheet type and which is specific to a device that is to be controlled, and where the second printer driver does not include the prohibition information, the second printer driver may fail to perform a prohibition process equivalent to the prohibition process which is set in the first printer driver. In contrast, for example, because the second printer driver corresponds to a newer version (the reason is not limited to this), use of the second printer driver may be desirable.

SUMMARY

Aspects of non-limiting embodiments of the present disclosure relate to an information processing apparatus and a non-transitory computer readable medium for information processing which enable execution, in a second printer driver, of a prohibition process equivalent to a prohibition process, which is set in a first printer driver, even when the second printer driver does not include prohibition information which describes unusable combinations of a function and a sheet type and which is specific to a device that is to be controlled.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a first printer driver, and a second printer driver. The first printer driver includes prohibition information specific to a device that is to be controlled. The second printer driver includes an association establishing unit and a receiving unit. The association establishing unit establishes an association with the first printer driver. The receiving unit receives print settings. The second printer driver transmits, to the device that is to be controlled, print data based on print settings that have been obtained through conversion performed on a basis of the prohibition information included in the first printer driver. The first printer driver is associated with the second printer driver by the association establishing unit.

BRIEF DESCRIPTION OF THE DRAWINGS

Exemplary embodiment of the present disclosure will be described in detail based on the following figures, wherein.

DETAILED DESCRIPTION

A suitable exemplary embodiment for implementing the present disclosure will be described below on the basis of the drawings.

Figure 1:
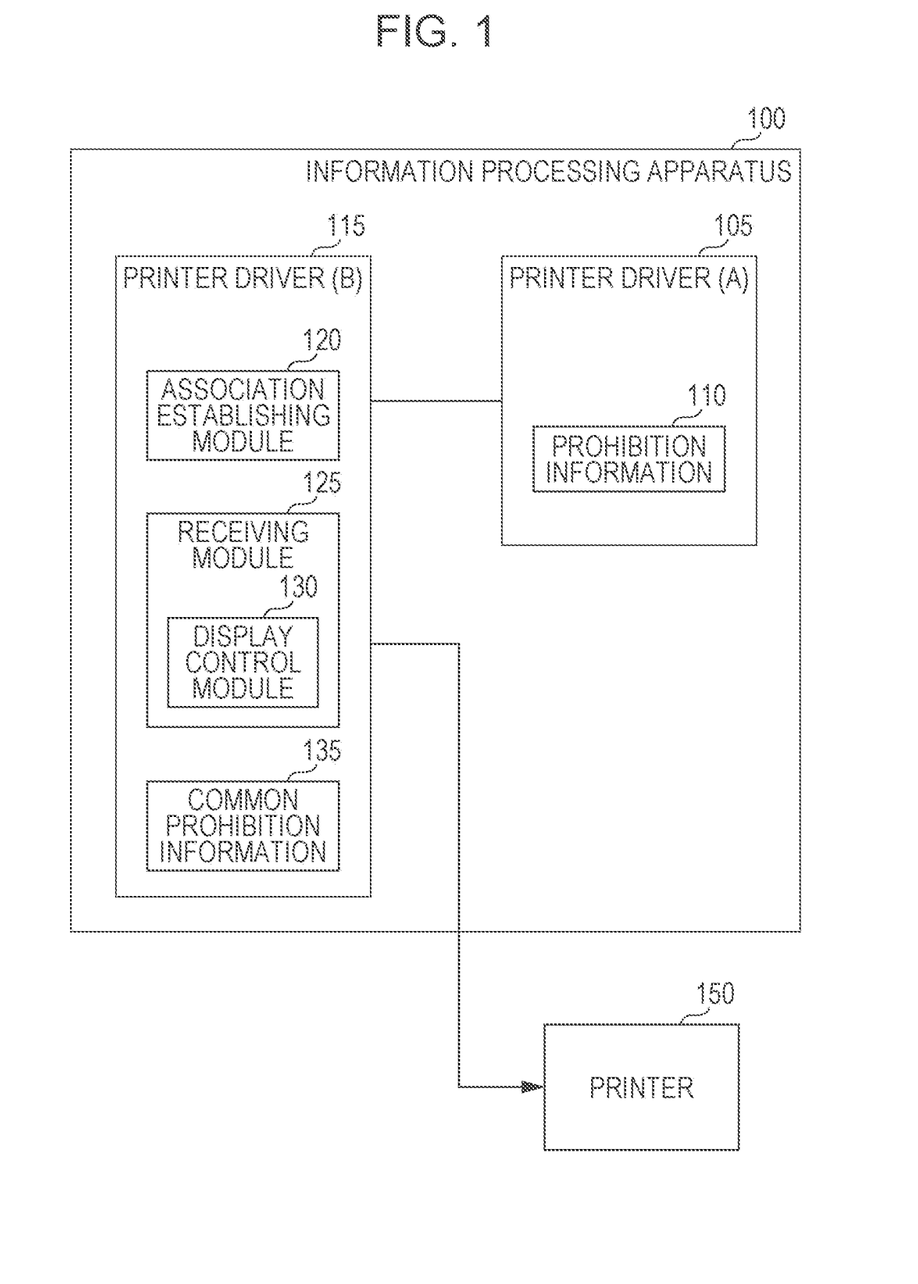
FIG. 1 is a schematic diagram illustrating an exemplary module configuration according to the exemplary embodiment.

FIG. 1 is a schematic diagram illustrating an exemplary module configuration of the exemplary embodiment.

In general, a module refers to a component, such as software (a computer program), which is logically separable, or hardware. Thus, a module in the exemplary embodiment refers to not only a module in terms of a computer program but also a module in terms of a hardware configuration. Consequently, the exemplary embodiment also describes a system, a method, and a computer program for functioning as a module (a program that causes a computer to execute procedures, a program that causes a computer to function as units, or a program that causes a computer to implement functions). For convenience of explanation, the terms "to store something" and "to cause something to store something", and their equivalent terms are used. When the exemplary embodiment is implemented by using computer programs, these terms mean that a storage device stores something or that a storage device is controlled so as to store something. One module may correspond to one function. However, in the implementation, one program may constitute one module, or one program may constitute multiple modules. In contrast, multiple programs may constitute a single module. Additionally, multiple modules may be executed by a single computer, or one module may be executed by multiple computers in a distributed or parallel processing environment. One module may include another module. Hereinafter, the term "connect" refers to logical connection, such as transmission/reception of data, an instruction, reference relationship between pieces of data, or login, as well as physical connection. The term "predetermined" refers to a state in which determination has been made before a target process. This term also includes a meaning in which determination has been made in accordance with the situation or state at that time or the situation or state before that time, not only before processes according to the exemplary embodiment start, but also before the target process starts even after the processes according to the exemplary embodiment have started. When multiple "predetermined values" are present, these may be different from one another, or two or more of the values (including all values, of course) may be the same. A description of "when A is satisfied, B is performed" is used as having a meaning of "Whether or not A is satisfied is determined and, when it is determined that A is satisfied, B is performed." However, this term does not include the case where the determination as to whether or not A is satisfied is unnecessary. In addition, the case in which things are listed, such as "A, B, and C", indicates exemplary listing unless otherwise noted, and includes the case in which only one member is selected (for example, only A).

A system or apparatus refers to one in which multiple computers, pieces of hardware, devices, and the like are connected to one another by using a communication unit such as a network which includes one-to-one communication connection, and also refers to one which is implemented by using a computer, a piece of hardware, a device, or the like. The terms "apparatus" and "system" are used as terms that are equivalent to each other. As a matter of course, the term "system" does not include what is nothing more than a social "mechanism" (social system) operating on man-made agreements.

For each of the processes performed by the respective modules, or for each of the processes if the processes are performed in a single module, target information is read out from a storage device. After the process is performed, the processing result is written in a storage device. Accordingly, description about the reading of data from the storage device before the process and the writing into the storage device after the process may be skipped. Examples of the storage device may include a hard disk drive, a random access memory (RAM), an external storage medium, a storage apparatus via a communication line, and a register in a central processing unit (CPU).

An information processing apparatus 100 according to the exemplary embodiment transmits a print instruction to a printer 150 (an exemplary device), and includes a printer driver (A) 105 and a printer driver (B) 115 as illustrated in the example in FIG. 1.

The printer driver (A) 105 is also called a dedicated driver, and the printer driver (B) 115 is also called a common driver. In the exemplary embodiment, the printer driver (A) has been installed in advance in the information processing apparatus 100. After that (for example, in an update of the printer driver architecture supported by an operating system (OS)), the printer driver (B) is installed.

The printer 150 is connected to the printer driver (B) 115 of the information processing apparatus 100. The printer 150 is controlled by the printer driver (B) 115, and is an image processing apparatus (also referred to as a printer, a print apparatus, an image forming apparatus, or the like).

The printer driver (A) 105 has prohibition information 110 specific to the printer 150 that is to be controlled, and is connected to the printer driver (B) 115.

The printer driver (B) 115 includes an association establishing module 120, a receiving module 125, and common prohibition information 135, and is connected to the printer driver (A) 105 and the printer 150. The printer driver (B) 115 transmits print data to the printer 150 that is to be controlled. The print data is prepared on the basis of print settings obtained through conversion based on the prohibition information 110 included in the printer driver (A) 105 with which an association has been established by the association establishing module 120. The term "establishing an association" indicates specifying a printer driver serving as a target of reception/transmission of print data and print settings.

The printer driver (B) 115 may transmit print settings, which are received by the receiving module 125, to the printer driver (A) 105 with which an association has been established by the association establishing module 120.

The printer driver (A) 105 may convert the print settings, which have been transmitted from the printer driver (B) 115, on the basis of the prohibition information, and may return the conversion result to the printer driver (B) 115.

A prohibition indicates unusable functions and sheet types, and unusable combinations of a function and a sheet type in the printer 150 that is to be controlled. The prohibition information 110 indicates information about such a prohibition, and is used in a prohibition process. The "prohibition process" is a process of prohibiting specification of an unusable function or sheet type and specification of an unusable combination of a function and a sheet type, in the printer 150 that is to be controlled. Examples of a process for prohibition include presenting no such prohibited options, disabling selection of such prohibited options although the options are presented, presenting a message that an option which has been specified is not capable of being used, and changing an option, which has been specified, to a different option (a so-called default setting).

The term "specific to a device" indicates one which is not included commonly by the other models. In addition to one included only by devices of the model, the term "specific to a device" may include one included also by a subset of the other models (not all the models).

Since the printer driver (B) 115 is not capable of performing a prohibition process specific to a device, the printer driver (B) 115 transmits print settings to the printer driver (A) 105. The printer driver (A) 105 performs the prohibition process, and returns, to the printer driver (B) 115, the print settings which have been subjected to the prohibition process. Thus, the printer driver (B) 115 is capable of transmitting print settings, which have been subjected to the prohibition process specific to the device, to the application or the OS that is to submit a print instruction.

The association establishing module 120 establishes an association with the printer driver (A) 105.

The receiving module 125 includes a display control module 130. The receiving module 125 receives print settings which indicate a print instruction to the printer 150.

The printer driver (A) 105 may generate information about functions and sheet types usable in the printer 150.

The printer driver (B) 115 may receive information (information about functions and sheet types usable in the printer 150) from the printer driver (A) 105.

Then, the display control module 130 may exert control so that, on the basis of the information received by the printer driver (B) 115, only the information about functions and sheet types usable in the printer 150 is displayed on a display apparatus so as to be selectable.

In addition, the display control module 130 may exert control so that only information about functions and sheet types settable in the printer driver (B) 115 is displayed on a display apparatus so as to be selectable.

The common prohibition information 135 is information about functions and sheet types, and combinations of a function and a sheet type, which are unusable commonly in multiple types of devices (including the printer 150). That is, the common prohibition information 135 is prohibition information included in the devices of all models which may be supported.

The printer driver (B) 115 may control multiple types of devices whose usable functions or sheet types are different from one another.

The printer driver (B) 115 does not include information about usable functions and sheet types specific to the printer 150 that is to be controlled.

The printer driver (B) 115 does not include prohibition information specific to the printer 150 that is to be controlled.

The expression, "The printer driver (B) 115 does not include prohibition information specific to the printer 150 that is to be controlled" may encompass the case in which "The printer driver (B) 115 does not include all of the prohibition information specific to the printer 150 that is to be controlled," as well as the case in which "The printer driver (B) 115 does not include part of the prohibition information specific to the printer 150 that is to be controlled." In the latter case, as a result, the printer driver (B) 115 includes part of the prohibition information specific to the printer 150 that is to be controlled. However, this indicates that the printer driver (B) 115 does not include all of the prohibition information specific to the printer 150 that is to be controlled, and indicates that the printer driver (A) 105 includes the part of the prohibition information which is not included in the printer driver (B) 115.

The printer driver (B) 115 has the common prohibition information 135 based on functions and sheet types which are usable commonly in multiple types of devices. The printer driver (B) 115 may convert again the print settings, which have been obtained through conversion performed by the printer driver (A) 105, on the basis of the common prohibition information 135.

The printer driver (B) 115 may have the common prohibition information 135 itself, or may generate the common prohibition information 135 by using the functions and sheet types which are usable commonly in multiple types of devices.

The association establishing module 120 may establish an association between the printer driver (B) 115 and the printer driver (A) 105 which is using the same port as the port that is being used by the printer driver (B) 115.

In addition, when there are multiple printer drivers (A) 105 that are using the same port as the port that is being used by the printer driver (B) 115, the association establishing module 120 may make a user select a printer driver (A) 105 with which an association is to be established.

When the printer driver (B) 115 receives an inquiry about the functions and sheet types usable in the printer 150, the printer driver (B) 115 may transmit, to the printer driver (A) 105, an inquiry about the functions and sheet types usable in the printer 150.

When the printer driver (A) 105 receives the inquiry, the printer driver (A) 105 may transmit, to the printer driver (B) 115, a reply about the functions and sheet types usable in the printer 150.

The printer driver (B) 115 may transmit, to the inquiry source, a reply about the functions and sheet types usable in the printer 150 which are described in the reply from the printer driver (A) 105.

The printer driver (B) 115 may merge the information about the functions and sheet types, which are usable in the printer 150 and which are described in the relay from the printer driver (A) 105, with the common prohibition information 135 included in the printer driver (B) 115, and may return, to the inquiry source, the information obtained through the merge.

Figure 2A:
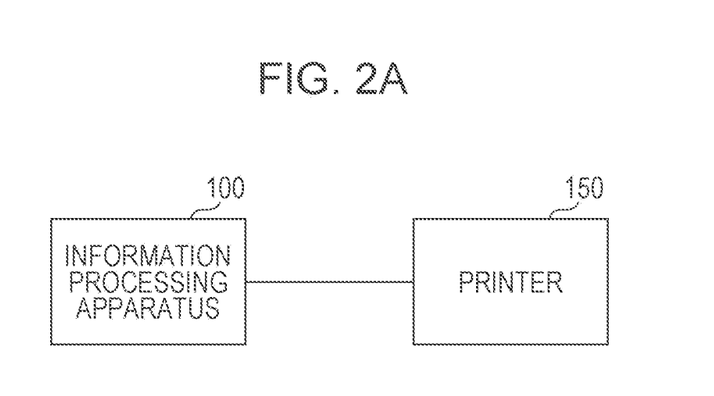
FIGS. 2A and 2B are diagrams for describing exemplary system configurations using the exemplary embodiment.
Figure 2B:
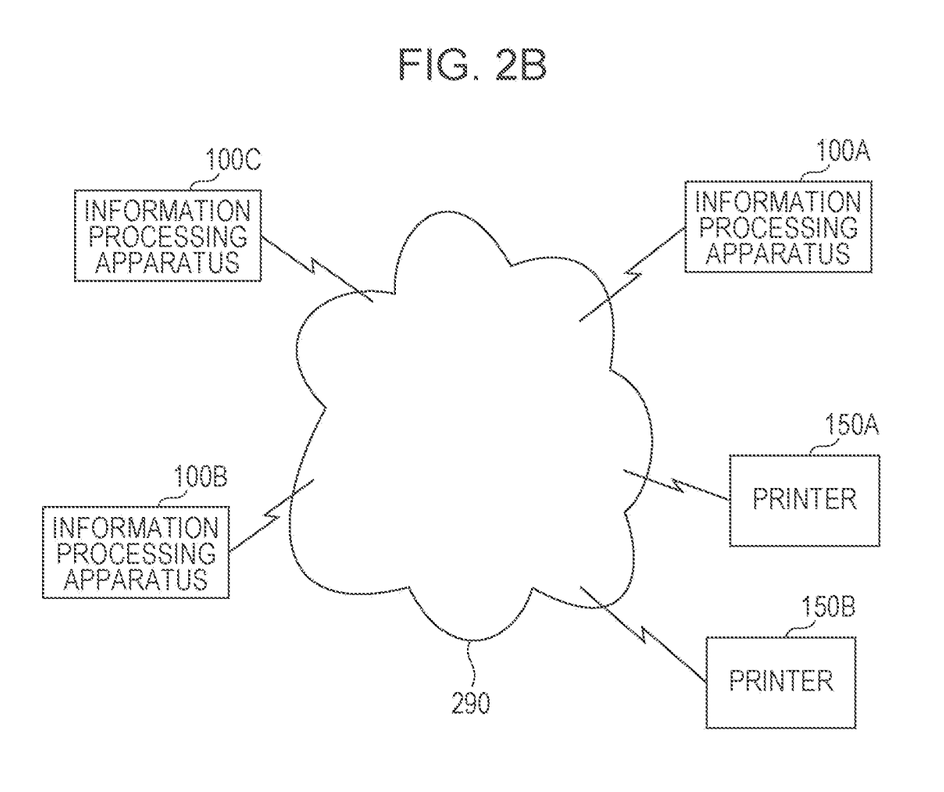

FIGS. 2A and 2B are diagrams for describing exemplary system configurations using the exemplary embodiment.

The example in FIG. 2A illustrates a stand-alone system.

The information processing apparatus 100 is connected to the printer 150. The information processing apparatus 100 may be connected to multiple printers 150.

The example in FIG. 2B illustrates a system using a network.

An information processing apparatus 100A, an information processing apparatus 100B, an information processing apparatus 100C, a printer A 150A, and a printer B 150B are connected to one another via a communication line 290. The communication line 290 may be a wireless line, a wired line, or a combination of these. For example, the communication line 290 may be the Internet, an intranet, or the like serving as a communication infrastructure.

The printer driver (B) 115 of the information processing apparatus 100 uses the prohibition information 110 in the printer driver (A) 105 to transmit a print instruction to the printer 150.

The architecture of printer drivers is changed from Version 3 to Version 4 in Windows® OS.

Compared with Version 3, Version 4 achieves enhancement of security and improvement in print quality. A printer driver of Version 3 is not capable of using detailed print settings from Store application.

A printer driver of Version 4 needs to be provided also for an existing model (printer 150).

In most cases, each existing model has provided a printer driver of Version 3 specific to the model, but has not provided a printer driver of Version 4.

When needs for Version 4 grow in the market, there arises a demand to provide printer drivers of Version 4 also for the existing models.

It is difficult to provide printer drivers of Version 4 specific to all of the existing models. That is, there are several hundred existing models. Thus, several hundred new printer drivers of Version 4 need to be developed. In most cases, it is difficult to manage to find man-hours for the development.

Accordingly, a common printer driver (the printer driver (B) 115 according to the exemplary embodiment) used commonly in the models is provided.

It is necessary to impose an appropriate prohibition also on printer drivers common to the models.

The term "prohibition" indicates a process of prohibiting specification of unusable functions and sheet types and specification of unusable combinations of a function and a sheet type.

Each dedicated printer driver (for example, each printer driver of Version 3 described above) performs a prohibition process appropriate for its model. For example, whether or not a combination of a sheet type and each output function (such as duplex printing, stapling, punching, or folding) may be used depends on each model.

A necessary prohibition process depends on each model. Examples of this are as follows.

Example 1

Whether or not duplex printing of a B6 size sheet may be performed depends on models. Specifically, the model A is not capable of performing duplex printing for the B6 size, whereas the model B is capable of performing duplex printing for the B6 size. Thus, whether or not duplex printing for the B6 size may be performed depends on models. It is necessary to perform a prohibition process in the model A.

Example 2

Whether or not the A3+ size may be used depends on models.

Example 3

Whether or not a label sheet may be used depends of models.

Example 4

Whether or not stapling of thick sheets may be performed depends on models.

To perform an appropriate prohibition process, information about each model (information about usable sheet types and functions and usable combinations of these) is required.

Therefore, preparation of the information for each existing model increases man-hours for the development. Further, the information for each model is to be held, thus increasing the size of a printer driver.

By using the example in FIG. 3, knowledge necessary to understand the exemplary embodiment will be described.

For example, a Windows printer driver has a mechanism described below. Both a printer driver of Version 3 and a printer driver of Version 4 have the following mechanisms.
(1) The Mechanism for Obtaining Usable Sheet Types and Functions Specifically, the GetPrintCapabilities application programming interface (API) is used. This is an API which is capable of obtaining a list of usable functions and sheet types in the extensible Markup Language (XML) format (the PrintCapabilities format). The API is also capable of distinguishing prohibited functions and options.
(2) The Mechanism for Performing a Prohibition Process on Specified Print Settings Specifically, the ValidatePrintTicket API is used. The API is capable of obtaining print settings (PrintTicket), which have been subjected to the prohibition process, when the print settings are specified in the XML format (PrintTicket format).

Figure 3:
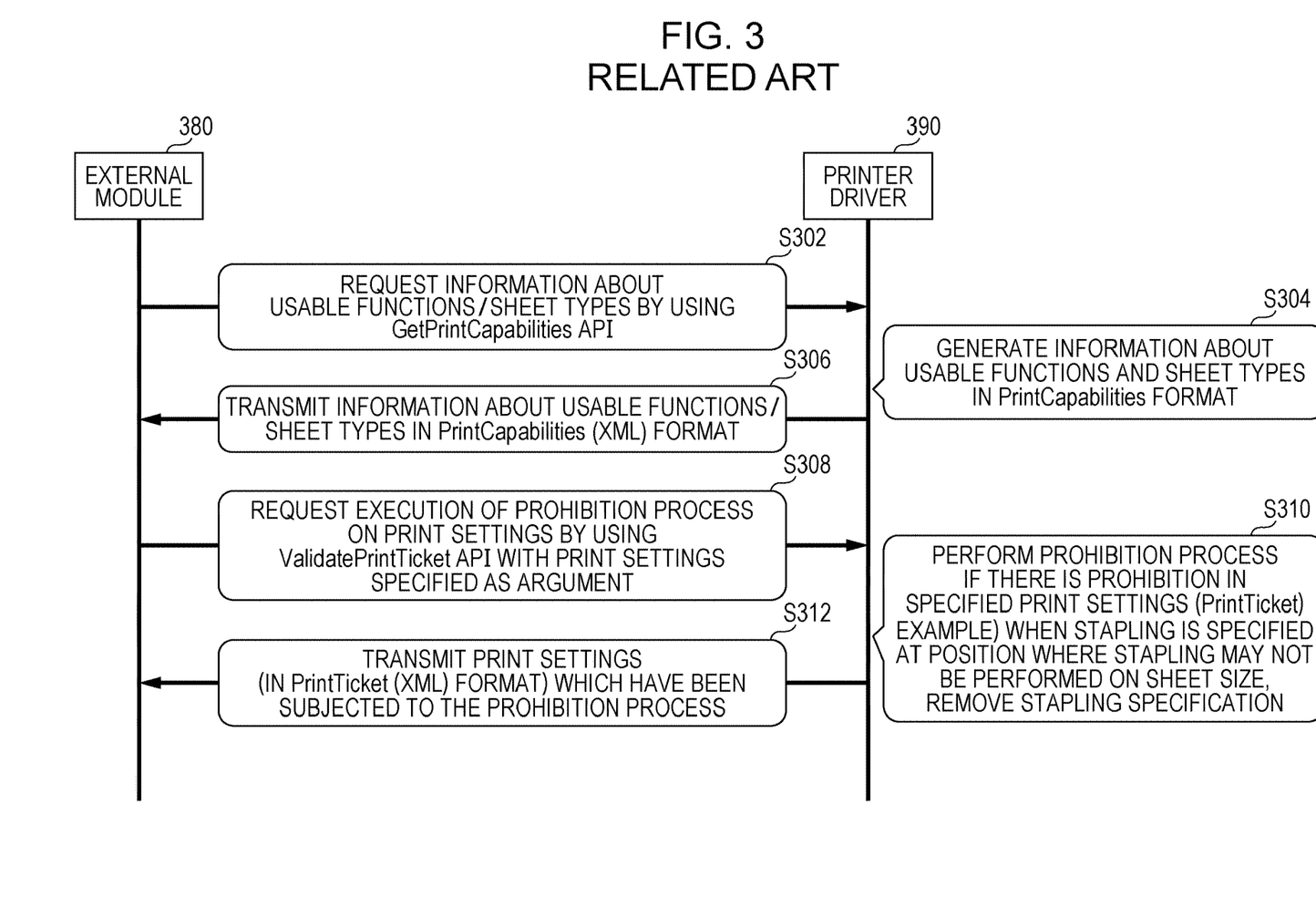
FIG. 3 is a flowchart of an exemplary process (an exemplary process of the related art) performed without use of the exemplary embodiment.

FIG. 3 is a flowchart of an exemplary process (an exemplary process of the related art) performed without use of the exemplary embodiment. An external module 380 and a printer driver 390 perform the process described below. The external module 380 is a part of the OS or a part of an application.

In step S302, the external module 380 requests, from the printer driver 390, information about usable functions/sheet types (specifically, the GetPrintCapabilities API described above).

In step S304, the printer driver 390 generates information about usable functions and sheet types in the PrintCapabilities format.

In step S306, the printer driver 390 transmits, to the external module 380, the information about usable functions and sheet types (in the PrintCapabilities (XML) format).

In step S308, the external module 380 requests the printer driver 390 to perform a prohibition process on print settings (specifically, the ValidatePrintTicket API described above). The print settings to be processed are specified as an argument.

In step S310, if there is a prohibition for the specified print settings (PrintTicket), the printer driver 390 performs the prohibition process. For example, when stapling is specified at a position where stapling may not be performed on the sheet size, the stapling specification is removed.

In step S312, the printer driver 390 transmits, to the external module 380, print settings (in the PrintTicket (XML) format) which have been subjected to the prohibition process.

Figure 4:
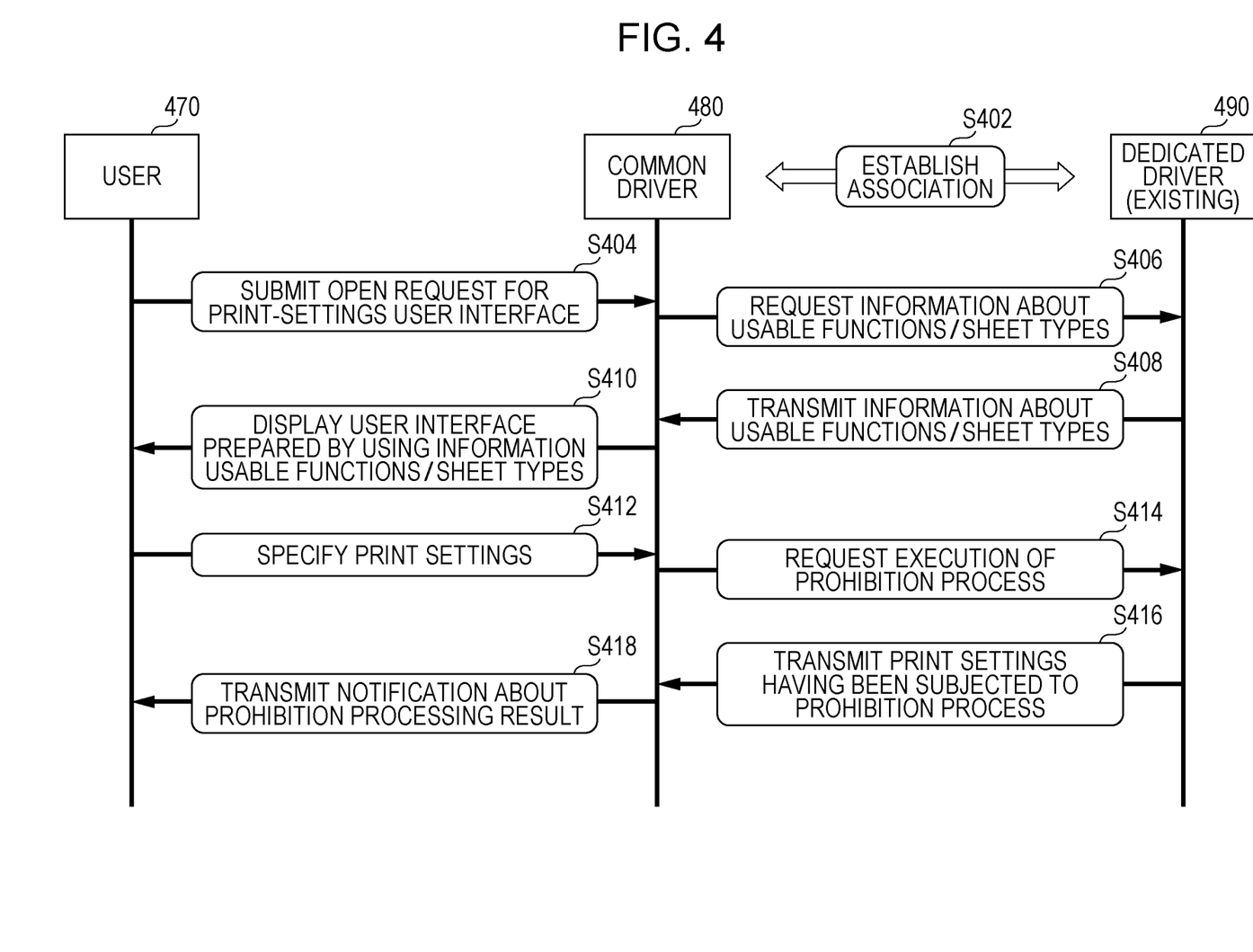
FIG. 4 is a flowchart of an exemplary process according to the exemplary embodiment.

FIG. 4 is a flowchart of an exemplary process according to the exemplary embodiment.

A common driver 480 (an exemplary printer driver (B) 115) and a dedicated driver 490 (an exemplary printer driver (A) 105) perform the process described below. A user 470 operates the common driver 480 which performs display for the user 470. That is, without operations on the dedicated driver 490, the user 470 may use the common driver 480 to perform printing.

In step S402, the common driver 480 establishes an association with the dedicated driver 490. That is, the common driver 480 establishes an association with the dedicated driver 490 for the printer 150 that is to perform printing.

An association between the common driver 480 and the dedicated driver 490 is established, for example, as follows.

(Method 1) The dedicated driver 490 with which an association is to be established is specified manually.

The common driver 480 displays, in a list, the dedicated drivers 490 having been already installed. The user 470 is made to specify a dedicated driver 490 with which an association is to be established.

(Method 2) An association is established by automatically detecting the dedicated driver 490 using the same port. Specifically, the process is performed as follows.

1) The dedicated drivers 490 having been already installed are extracted.

2) The port used by each dedicated driver 490 is detected.

3) An association is established with the dedicated driver 490 using the same port as the common driver 480 itself.

In step S404, the user 470 submits, to the common driver 480, an open request for a print-settings user interface. For example, the open request corresponds to a print instruction.

In step S406, the common driver 480 requests, from the dedicated driver 490, information about functions/sheet types usable in the printer 150.

In step S408, the dedicated driver 490 transmits, to the common driver 480, information about functions/sheet types usable in the printer 150.

In step S410, the common driver 480 displays, to the user 470, a user interface prepared by using the information about functions/sheet types usable in the printer 150. For example, in the case where the printer 150 may perform printing on a sheet whose maximum size is the A4 size, display of the setting for the A3 size is disabled. Examples of disabled display include display in which the setting for the A3 size itself is not displayed, and display in which the setting for the A3 size is displayed so as not to be selectable (such as faint display).

In step S412, the user 470 specifies print settings for transmission to the common driver 480.

In step S414, the common driver 480 requests the dedicated driver 490 to perform the prohibition process for the printer 150.

In step S416, the dedicated driver 490 transmits, to the common driver 480, print settings having been subjected to the prohibition process for the printer 150.

In step S418, the common driver 480 notifies the user 470 of the result of the prohibition process. For example, the user 470 is notified of a message, "Since stapling is not capable of being performed at the specified position, the setting of stapling has been removed."

In the exemplary embodiment, the common driver 480 usable commonly by the models of devices (such as the printer 150) is provided. The common driver 480 itself does not have prohibition information for each model.

As in the flowchart in the example in FIG. 4, the common driver 480 is associated with the dedicated driver 490 which is a driver dedicated to an existing model. The common driver 480 may delegate the prohibition process to the dedicated driver 490 associated with the common driver 480. In response to a request for the print-settings user interface from the user 470, the common driver 480 obtains information about usable functions/sheet types from the dedicated driver 490 associated with the common driver 480, and displays the user interface prepared by using the obtained information. In response to specification of print settings from the user 470, the common driver 480 requests the dedicated driver 490, which is associated with the common driver 480, to perform the prohibition process, and notifies the user 470 of the result.

Figure 5:
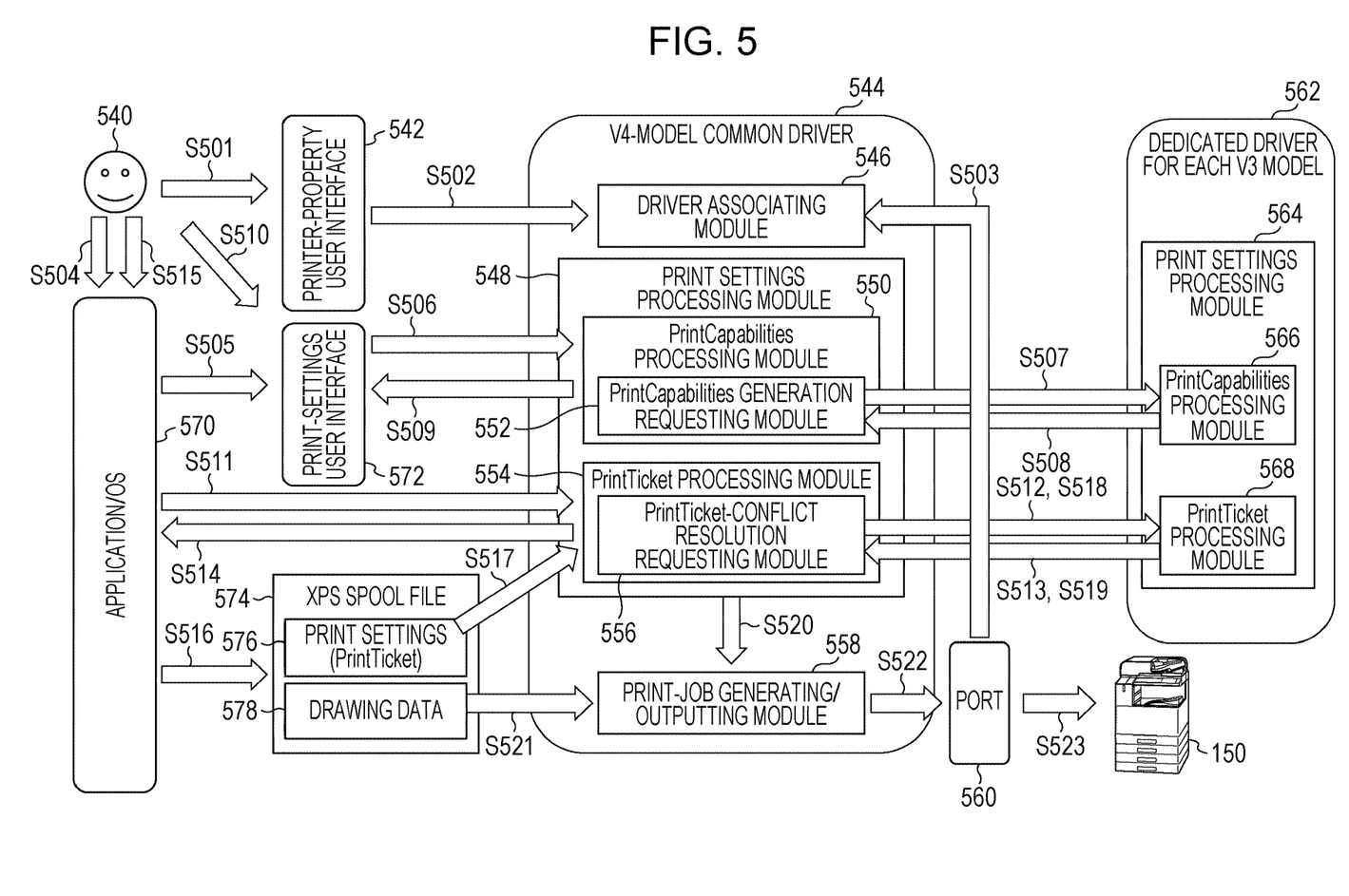
FIG. 5 is a diagram for describing exemplary processes according to the exemplary embodiment.

FIG. 5 is a diagram for describing exemplary processes according to the exemplary embodiment.

A V4-model common driver 544 includes a driver associating module 546, a print settings processing module 548, and a print-job generating/outputting module 558. The V4-model common driver 544 is a concrete example of the printer driver (B) 115.

The driver associating module 546 is a concrete example of the association establishing module 120.

The print settings processing module 548 includes a PrintCapabilities processing module 550 and a PrintTicket processing module 554. The print settings processing module 548 is a concrete example of the receiving module 125.

The PrintCapabilities processing module 550 includes a PrintCapabilities generation requesting module 552.

The PrintTicket processing module 554 includes a PrintTicket-conflict resolution requesting module 556.

A dedicated driver 562 prepared for each V3 model (hereinafter referred to as a V3-model dedicated driver 562) includes a print settings processing module 564. The V3-model dedicated driver 562 is a concrete example of the printer driver (A) 105.

The print settings processing module 564 includes a PrintCapabilities processing module 566 and a PrintTicket processing module 568.

An XML Paper Specification (XPS) spool file 574 includes print settings (PrintTicket) 576 and drawing data 578.

(1) An exemplary process of associating the V4-model common driver 544 with the V3-model dedicated driver 562 will be described. The processes from step S501 to step S502 or the process in step S503 may be performed.

(Method 1) Establishing an association between the V4-model common driver 544 and the dedicated driver 562 prepared for each existing V3 model (manual operation)

In step S501, a user 540 opens a printer-property user interface 542 to specify the print queue of the dedicated driver 562 prepared for each existing V3 model.

In step S502, the driver associating module 546 retains the print queue, which has been selected by the user 540, as an inquiry destination of a print setting process (This indicates a process of establishing an association).

(Method 2) Establishing an association between the V4-model common driver 544 and the dedicated driver 562 prepared for each existing model (automatic process)

In step S503, the driver associating module 546 searches for the print queue of the V3-model dedicated driver 562 which is using the same port 560, and retains the found print queue as an inquiry destination of a print setting process. If there are multiple print queues of the V3-model dedicated drivers 562 which are using the same port 560, the manual setting described in (Method 1) is performed on the V3-model dedicated drivers 562.

Figure 6:
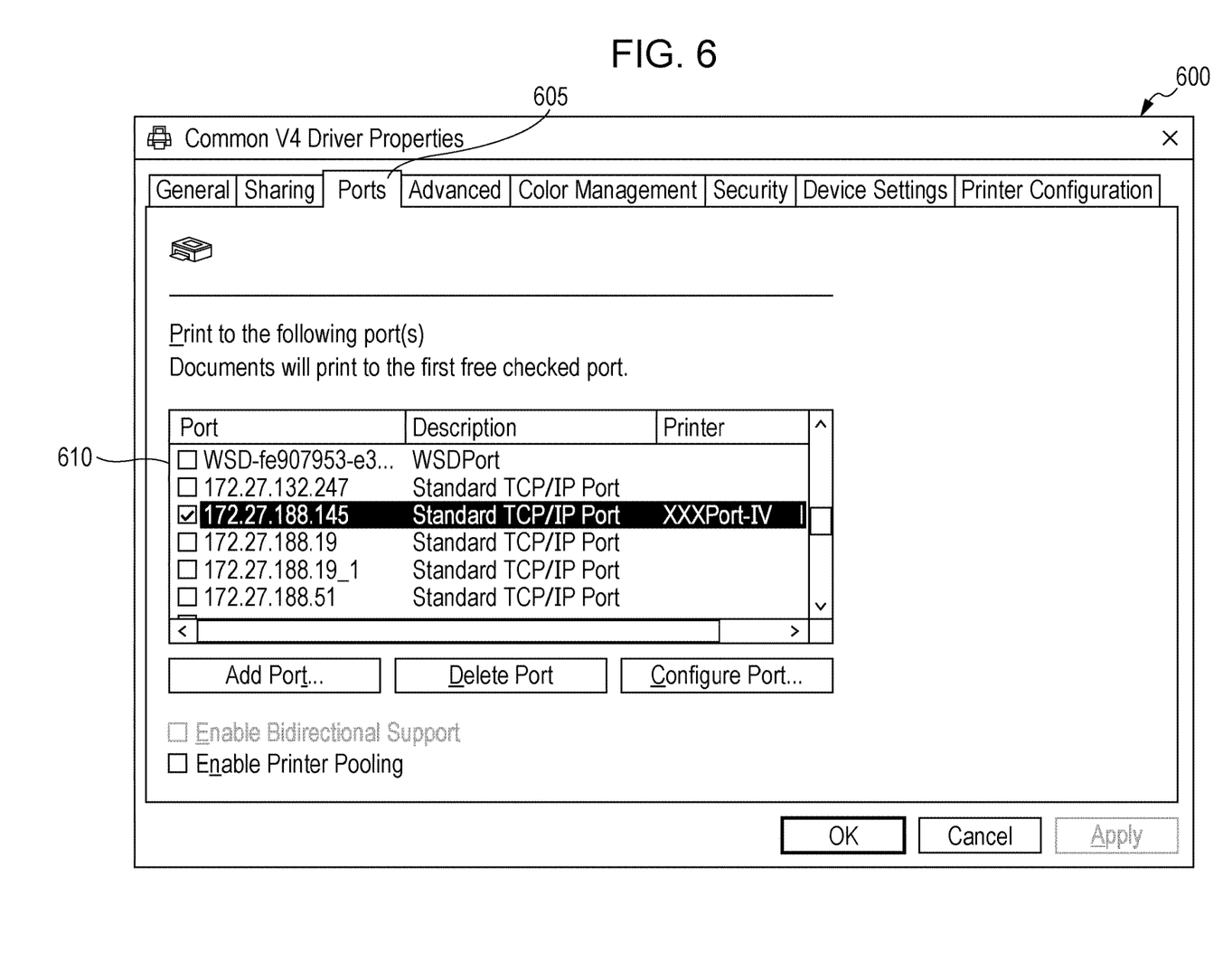
FIG. 6 is a diagram for describing an exemplary process (an example of setting a port) according to the exemplary embodiment.

FIG. 6 is a diagram for describing an exemplary process (exemplary port setting) according to the exemplary embodiment. FIG. 6 illustrates an exemplary processing result by using (Method 1) or (Method 2).

For example, as illustrated in FIG. 6, in the case where a driver property screen 600 of the V4-model common driver 544 is opened, when the user 540 selects the Port tag 605, the corresponding port has been selected in a port display area 610.

Figure 7:
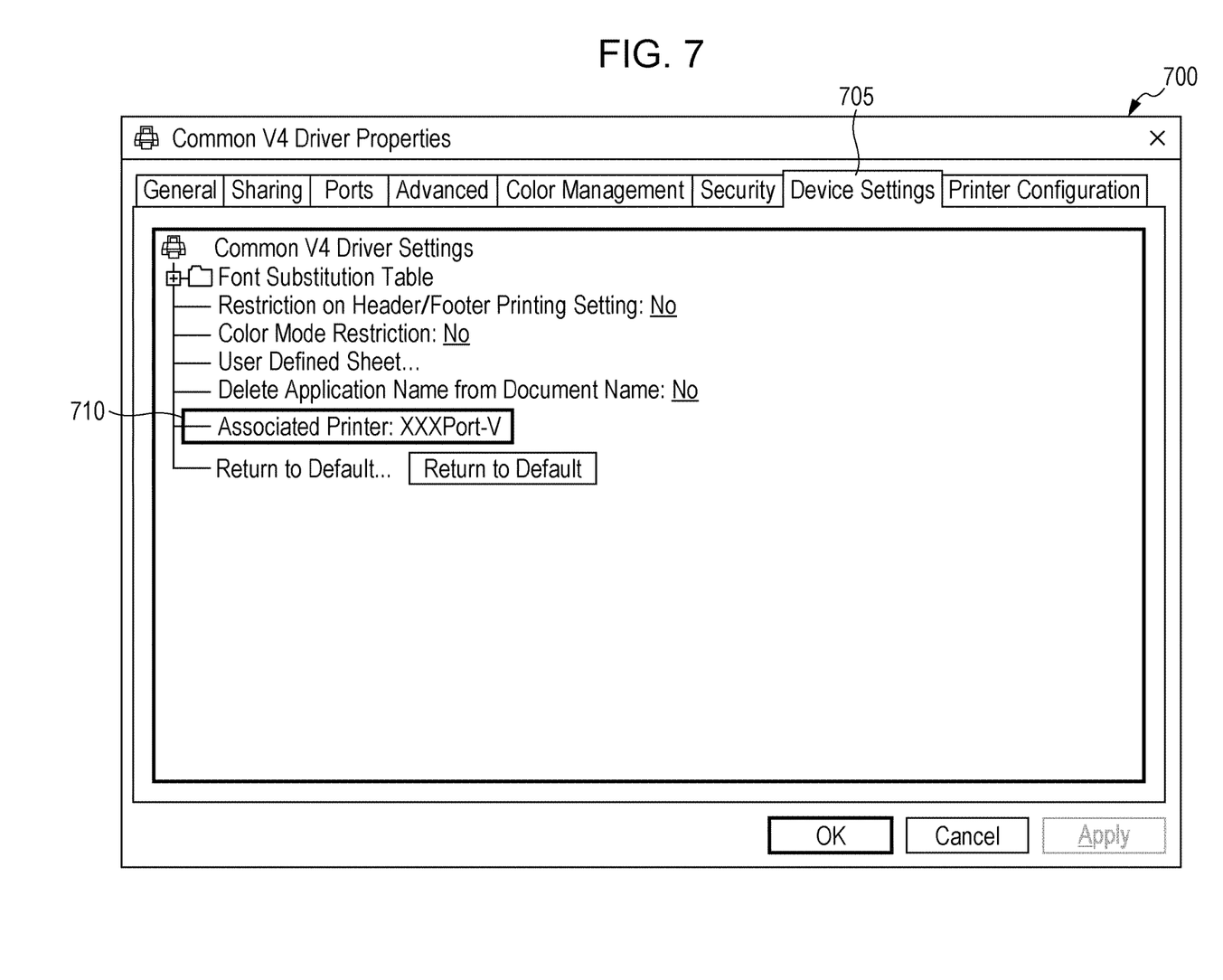
FIG. 7 is a diagram for describing an exemplary process (an example of setting a port) according to the exemplary embodiment.

FIG. 7 is a diagram for describing an exemplary process (exemplary port setting) according to the exemplary embodiment. FIG. 7 illustrates an exemplary process by using (Method 1).

For example, as illustrated in FIG. 7, in the case where a driver property screen 700 of the V4-model common driver 544 is opened, when the user 540 selects the Device Settings tag 705, an associated-printer setting field 710 is displayed. The user 540 selects the V3-model dedicated driver 562 in the associated-printer setting field 710.

(2) An exemplary process of displaying the print-settings user interface will be described. This corresponds to the processes from step S504 to step S509.

In steps S504 and S505, a print-settings user interface 572 is activated from an application/OS 570 according to an operation performed by the user 540.

In step S506, the print-settings user interface 572 requests a PrintCapabilities object from the V4-model common driver 544.

PrintCapabilities, which is a standard format of Windows OS, describes, in the XML format, the following information: information about functions (such as the sheet size and the N-up) provided by a printer driver (the V4-model common driver 544 or the V3-model dedicated driver 562); information about options of the functions (such as A4, A3, Letter, and the like as the sheet size, and 2UP, 4UP, 8UP, and the like as the N-up); and information about whether or not the functions and the options are enabled.

In step S507, the PrintCapabilities processing module 550 of the V4-model common driver 544 requests a PrintCapabilities object from the V3-model dedicated driver 562 stored in the driver associating module 546 (that is, the associated V3-model dedicated driver 562), through the PrintCapabilities generation requesting module 552.

In step S508, the V3-model dedicated driver 562 causes the PrintCapabilities processing module 566 to generate a PrintCapabilities object for the V3-model dedicated driver 562 itself, and returns the generated PrintCapabilities object.

In step S509, the PrintCapabilities processing module 550 of the V4-model common driver 544 merges the PrintCapabilities object, which has been returned from the V3-model dedicated driver 562, with a PrintCapabilities object for the V4-model common driver 544 itself, and returns the resulting object to the print-settings user interface 572. The print-settings user interface 572 presents, to the user 540, the user interface prepared by using the content of the PrintCapabilities object.

If functions and options, which are supported in the PrintCapabilities object for the V3-model dedicated driver 562, are not supported by the V4-model common driver 544 itself (not the printer 150, but the V4-model common driver 544 itself), such functions and options need to be changed to functions and options which are regarded as being unsupported.

Figure 8:
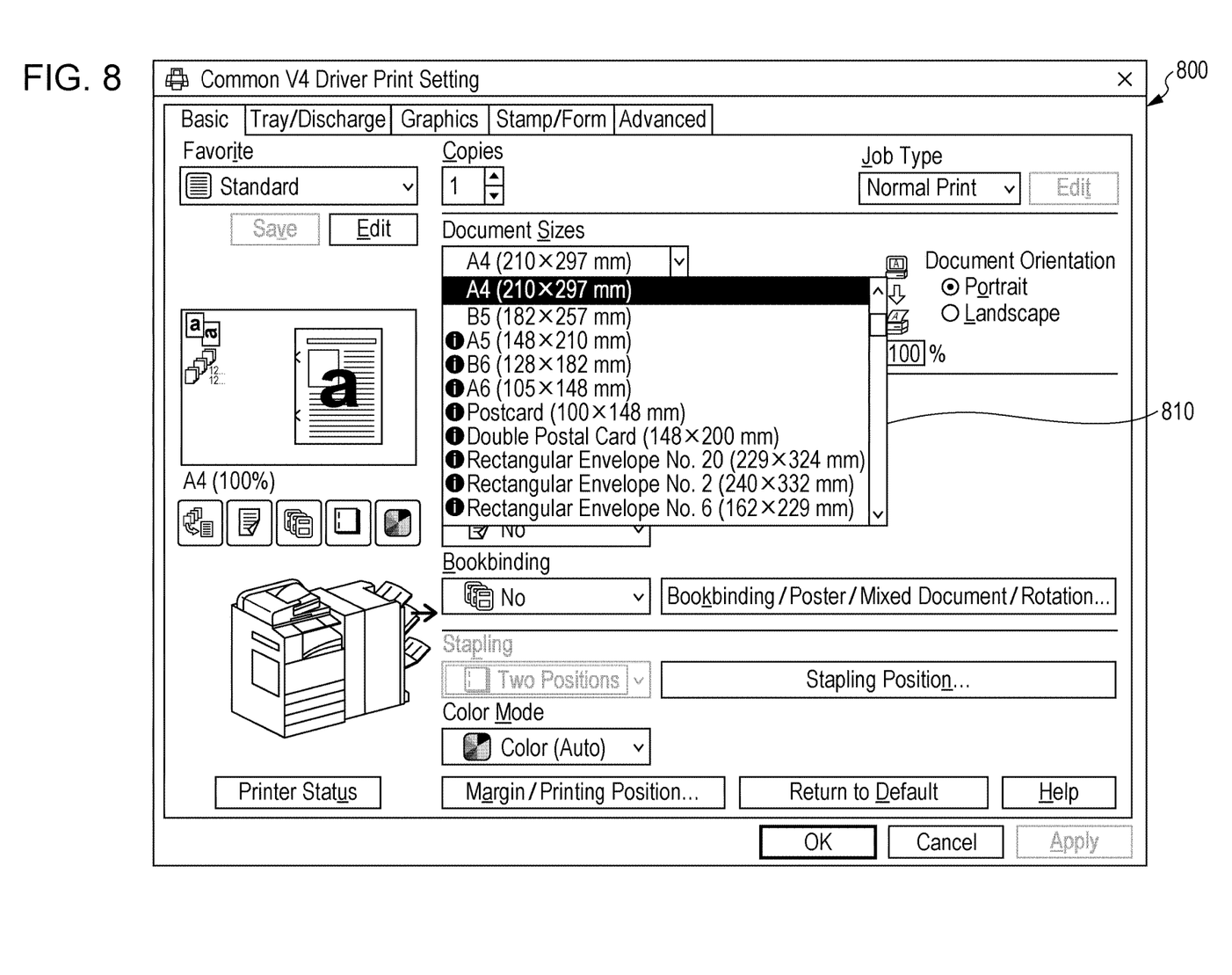
FIG. 8 is a diagram for describing an exemplary process (an example of displaying a print setting screen) according to the exemplary embodiment.

For example, a print setting screen 800 is displayed to the user 540. FIG. 8 is a diagram for describing an exemplary process (exemplary display of the print setting screen 800) according to the exemplary embodiment. In the print setting screen 800, a document-size selection area 810 is displayed. For example, in the document-size selection area 810, the A4 size and the B5 size are illustrated so as to be enabled, while the other unsupported sizes (such as the A5 size and the B6 size) are not capable of being selected.

(3) An exemplary process of issuing an instruction for print setting will be described. This corresponds to the processes from step S510 to step S514.

In step S510, the user 540 uses the print-settings user interface 572 to edit print settings.

In step S511, the application/OS 570 requests the V4-model common driver 544 to perform a compatibility check process on the print settings in the PrintTicket format which have been edited by the user 540. Specifically, the application/OS 570 requests a check on whether or not there is a conflict in the settings.

In step S512, the PrintTicket processing module 554 of the V4-model common driver 544 requests the V3-model dedicated driver 562, through the PrintTicket-conflict resolution requesting module 556, to perform the compatibility check process on the PrintTicket object.

In step S513, the PrintTicket processing module 568 of the V3-model dedicated driver 562 performs the compatibility check process (specifically, checks if there is a conflict, and, if there is, changes the settings so that the conflict is resolved) on the PrintTicket object received in the request, and returns the processed PrintTicket object.

In step S514, the PrintTicket processing module 554 of the V4-model common driver 544 further performs a compatibility check process, which is prepared in the V4-model common driver 544 itself, on the PrintTicket object which has been subjected to the compatibility check process by the V3-model dedicated driver 562, and returns the processed PrintTicket object to the application/OS 570.

(4) An exemplary process of issuing a print instruction and an exemplary process of performing printing will be described. These correspond to the processes from step S515 to step S523.

In step S515, the user 540 instructs the application/OS 570 to perform printing.

In step S516, the application/OS 570 (especially, the OS) performs spooling, in the XPS format, on the drawing data 578 (which is also referred to as a drawing instruction) and the print settings (PrintTicket) 576, which are output by the application/OS 570.

In steps S517, S518, and S519, the PrintTicket processing module 554 of the V4-model common driver 544 performs again the compatibility check process on the print settings (PrintTicket) 576 stored in the XPS spool file 574. The reason for this is as follows. The print settings (PrintTicket) 576, which have been subjected to the compatibility check process, are stored. However, even if the process has been completed normally, a change in the sheet size or the like may be made after the first compatibility check process. Similarly to the processes from step S512 to step S513 which are described above, the V3-model dedicated driver 562 is requested, through the PrintTicket-conflict resolution requesting module 556, to perform the compatibility check process on the print settings (PrintTicket) 576, and the processing result is obtained.

In steps S520, S521, S522, and S523, the print-job generating/outputting module 558 generates a print job from the print settings (PrintTicket) 576, which have been subjected to the compatibility check process, and the drawing data 578, and outputs the generated print job to the printer 150 through the port 560. After that, the printer 150 performs printing according to the print job.

Thus, in the exemplary embodiment, the following processes are especially performed.

1) To provide an appropriate print-settings user interface (specifically, which enables usable functions and sheet types to be distinguished) to the user 540, PrintCapabilities processes performed by the PrintCapabilities processing module 566 of the dedicated driver 562 prepared for each existing V3 model are used.

2) To perform the compatibility check process on print settings which are set by the user 540, PrintTicket processes performed by the PrintTicket processing module 568 of the dedicated driver 562 prepared for each existing V3 model are used.

To do these, one of the processes described below may be performed.

1) The V4-model common driver 544 does not perform the prohibition process, and completely uses only the prohibition process performed by the V3-model dedicated driver 562.

2) The V4-model common driver 544 itself also performs the prohibition process. That is, the V4-model common driver 544 performs the prohibition process based on the common prohibition information.

To do this, one of the processes described below is performed.

2-1) A PrintCapabilities object generated by the V3-model dedicated driver 562 is merged with a PrintCapabilities object for the V4-model common driver 544 itself. Specifically, the option having more severe restriction may be adopted for each function.

2-2) The V4-model common driver 544 itself performs again the compatibility check process on the PrintTicket object which has been subjected to the compatibility check process by the V3-model dedicated driver 562.

Figure 9:
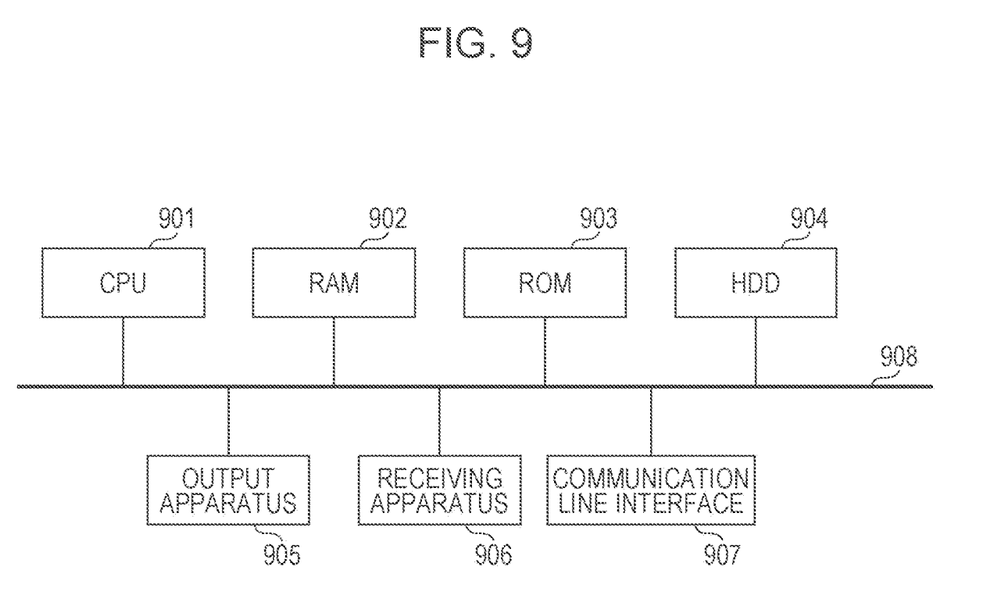
FIG. 9 is a block diagram illustrating an exemplary hardware configuration of a computer implementing the exemplary embodiment.

As illustrated in FIG. 9, the hardware configuration of a computer executing programs serving as the exemplary embodiment indicates a typical computer. Specifically, a computer or the like which may function as a personal computer or a server may be used. That is, as a concrete example, a CPU 901 is used as a processor (arithmetic logical unit). A RAM 902, a read-only memory (ROM) 903, and a hard disk drive (HDD) 904 are used as storage devices. As the HDD 904, for example, an HDD and a solid state drive (SSD) which is a flash memory may be used. The computer includes the CPU 901, the RAM 902, the ROM 903, the HDD 904, a receiving apparatus 906, an output apparatus 905, a communication line interface 907, and a bus 908. The CPU 901 executes programs, for example, for the printer driver (A) 105, the printer driver (B) 115, the association establishing module 120, the receiving module 125, the display control module 130, the common driver 480, the dedicated driver 490, the printer-property user interface 542, the V4-model common driver 544, the driver associating module 546, the print settings processing module 548, the PrintCapabilities processing module 550, the PrintCapabilities generation requesting module 552, the PrintTicket processing module 554, the PrintTicket-conflict resolution requesting module 556, the print-job generating/outputting module 558, the V3-model dedicated driver 562, the print settings processing module 564, the PrintCapabilities processing module 566, the PrintTicket processing module 568, the application/OS 570, the print-settings user interface 572, and the XPS spool file 574. The RAM 902 is used to store these programs and data. The ROM 903 is used to store, for example, programs for starting the computer. The HDD 904 is an auxiliary storage device which stores the prohibition information 110, the common prohibition information 135, the XPS spool file 574, the print settings (PrintTicket) 576, the drawing data 578, and the like. The receiving apparatus 906 receives data on the basis of users' operations (including a motion, a voice, and the line of sight) on a keyboard, a mouse, a touch screen, a microphone, a camera (including a line-of-sight detecting camera or the like), and the like. Examples of the output apparatus 905 include a cathode-ray tube (CRT), a liquid-crystal display, and a speaker. The communication line interface 907 such as a network interface card is used to connect to a communication network. The bus 908 is used to connect these units to one another for data transfer. Such computers may be connected to one another over a network.

For an exemplary embodiment which is achieved by using computer programs and which serves as the above-described exemplary embodiment, the computer programs which are software are read into a system having the hardware configuration, and the software and hardware resources cooperate with each other to achieve the above-described exemplary embodiment.

The hardware configuration in FIG. 9 is merely one exemplary configuration. The exemplary embodiment is not limited to the configuration in FIG. 9, and may have any configuration as long as the modules described in the exemplary embodiment may be executed. For example, a subset of the modules may be formed of dedicated hardware, such as an application specific integrated circuit (ASIC) or a field-programmable gate array (FPGA), and a subset of the modules may be installed in an external system connected through a communication line. In addition, systems having the configuration illustrated in FIG. 9 may be connected to one another through communication lines and may cooperate with one another. In particular, the hardware configuration may be installed in portable information communication equipment (including a portable phone, a smartphone, a mobile device, and a wearable computer), home information equipment, a robot, a copier, a fax, a scanner, a printer, a multi-function device (an image processing device having at least two of the functions of scanning, printing, copying, faxing, and the like), or the like as well as a personal computer.

The programs described above may be provided through a recording medium storing the programs, or may be provided through a communication unit. In these cases, for example, the programs described above may be interpreted as a disclosure of "a computer-readable recording medium that stores a program".

The term "a computer-readable recording medium that stores a program" refers to a computer-readable recording medium that stores programs and that is used for, for example, installation and execution of the programs and distribution of the programs.

Examples of the recording medium include a digital versatile disk (DVD) having a format of "DVD-recordable (DVD-R), DVD-rewritable (DVD-RW), DVD-random access memory (DVD-RAM), or the like" which is a standard developed by the DVD forum or having a format of "DVD+recordable (DVD+R), DVD+rewritable (DVD+RW), or the like" which is a standard developed by the DVD+RW alliance, a compact disk (CD) having a format of CD read only memory (CD-ROM), CD recordable (CD-R), CD rewritable (CD-RW), or the like, a Blu-ray™ Disk, a magneto-optical disk (MO), a flexible disk (FD), a magnetic tape, a hard disk, a ROM, an electrically erasable programmable ROM (EEPROM™), a flash memory, a RAM, and a secure digital (SD) memory card.

For example, all or a subset of the above-described programs may be stored and distributed by recording them on the recording medium. In addition, the programs may be transmitted through communication, for example, by using a transmission medium of, for example, a wired network or a wireless communication network which is used for a local area network (LAN), a metropolitan area network (MAN), a wide area network (WAN), the Internet, an intranet, an extranet, and the like, or a combination of these. Alternatively, the programs may be carried on carrier waves.

The above-described programs may form a subset or all of other programs, or may be recorded on a recording medium along with other programs. Alternatively, the programs may be recorded on multiple recording media by dividing the programs. The programs may be recorded in any format, such as compression or encryption, as long as it is possible to restore the programs.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a first printer driver; and
    a second printer driver, wherein
    the first printer driver includes prohibition information specific to a device that is to be controlled,
    the second printer driver is programmed to
        associate the first printer driver with the second printer driver, receive user specified print settings indicating a print instruction to the device that is to be controlled, receive converted print settings indicating the print instruction to the device that is to be controlled, the converted print settings being the user specified print settings having been converted on a basis of the prohibition information included in the first printer driver such that a user selected option for one of the print settings is changed to a different option for the one of the print settings, and transmit, to the device that is to be controlled, print data based on the converted print settings, the second printer driver transmits, to the first printer driver, the user specified print settings before conversion based on the prohibition information, and the first printer driver converts, on the basis of the prohibition information, the user specified print settings received from the second printer driver, and returns the converted print settings to the second printer driver.

2. The information processing apparatus according to claim 1, wherein the first printer driver generates information about a function and a sheet type which are usable in the device, wherein the second printer driver receives the information from the first printer driver, and wherein the second printer driver is further programed to exert control so as to cause a display to perform display in such a manner that only the information about the function and the sheet type which are usable in the device is selectable, the display being performed on a basis of the information received by the second printer driver.

3. The information processing apparatus according to claim 2, wherein the second printer driver exerts control so as to cause the display to perform display in such a manner that only information about a function and a sheet type which are settable by the second printer driver is selectable.

4. The information processing apparatus according to claim 1, wherein the second printer driver is capable of controlling a plurality of types of devices whose usable functions or sheet types are different from one another.

5. The information processing apparatus according to claim 4, wherein the second printer driver includes common prohibition information based on a function and a sheet type which are usable commonly in the plurality of types of devices, and the second printer driver converts again, on a basis of the common prohibition information, the converted print settings that have been obtained through conversion performed by the first printer driver.

6. The information processing apparatus according to claim 1, wherein the second printer driver does not include information about a usable function and a usable sheet type which are specific to the device that is to be controlled.

7. The information processing apparatus according to claim 1, wherein the second printer driver does not include the prohibition information specific to the device that is to be controlled.

8. The information processing apparatus according to claim 1, wherein the first printer driver uses an identical port to a port that is being used by the second printer driver.

9. The information processing apparatus according to claim 8, wherein, when there are a plurality of first printer drivers using the identical port to the port that is being used by the second printer driver, the second printer driver allows a user selection of one of the plurality of first printer drivers that is to be associated with the second printer driver.

10. The information processing apparatus according to claim 1, wherein, upon reception of an inquiry about a function and a sheet type which are usable in the device, the second printer driver transmits, to the first printer driver, the inquiry about the function and the sheet type which are usable in the device, wherein, upon reception of the inquiry, the first printer driver returns, to the second printer driver, information about the function or the sheet type which are usable in the device, and the second printer driver returns, to a source having transmitted the inquiry, the information which is returned from the first printer driver and which describes the function and the sheet type which are usable in the device.

11. The information processing apparatus according to claim 10, wherein the second printer driver merges the information returned from the first printer driver, with common device information included in the second printer driver, the information describing the function and the sheet type which are usable in the device, and returns, to the source having transmitted the inquiry, the information obtained through the merge.

12. A non-transitory computer readable medium storing a program causing a computer to execute a process for information processing, the computer being a computer in which a first printer driver has been installed, the first printer driver including prohibition information specific to a device that is to be controlled, the process comprising:

establishing an association with the first printer driver;

receiving user specified print settings indicating a print instruction to the device that is to be controlled, transmitting the user specified print settings, that indicate the print instruction to the device that is to be controlled, to the first printer driver before conversion of the user specified print settings based on the prohibition information included in the first printer driver;

receiving converted print settings, the received converted print settings being the user specified print settings having been converted by the first printer driver on a basis of the prohibition information such that a user selected option for one of the print settings is changed to a different option for the one of the print settings; and transmitting, to the device that is to be controlled, print data based on the received converted print settings.

* * * * *